United States Patent [19]

Wright et al.

[11] 3,915,834
[45] Oct. 28, 1975

[54] ELECTROWINNING CELL HAVING AN ANODE WITH NO MORE THAN ONE-HALF THE ACTIVE SURFACE AREA OF THE CATHODE

[75] Inventors: Craig Nellis Wright; Kenneth Julian Richards, both of Salt Lake City, Utah

[73] Assignee: Kennecott Copper Corporation, New York, N.Y.

[22] Filed: Apr. 1, 1974

[21] Appl. No.: 456,531

[52] U.S. Cl. ............... 204/267; 204/106; 204/242; 204/284
[51] Int. Cl.² ........................................... C25C 7/00
[58] Field of Search .......... 204/106, 242, 267, 281, 204/DIG. 7, 268, 280, 284

[56] References Cited
UNITED STATES PATENTS

| | | | |
|---|---|---|---|
| 3,441,495 | 4/1969 | Colman | 204/268 |
| 3,821,097 | 6/1974 | Ettel | 204/106 |

FOREIGN PATENTS OR APPLICATIONS

| | | | |
|---|---|---|---|
| 100,264 | 11/1916 | United Kingdom | 204/284 |

Primary Examiner—John H. Mack
Assistant Examiner—W. I. Solomon
Attorney, Agent, or Firm—Mallinckrodt & Mallinckrodt

[57] ABSTRACT

An electrowinning cell, whose anode-cathode surface area relationship, and, preferably also, whose anode active surface site locations, are such as to inhibit redox reactions with electrolytes having significant concentrations of ferric or other oxidizing ions, thereby increasing current efficiency and decreasing localized cathode loop corrosion. Each pair of anode and cathode of equivalent size and shape has an anode active surface area that is effectively less than the cathode active surface area, to inhibit redox reactions and improve current efficiency, such anode active surface area preferably being recessed within the anode body so as to be protected from electrolyte turbulence.

8 Claims, 7 Drawing Figures

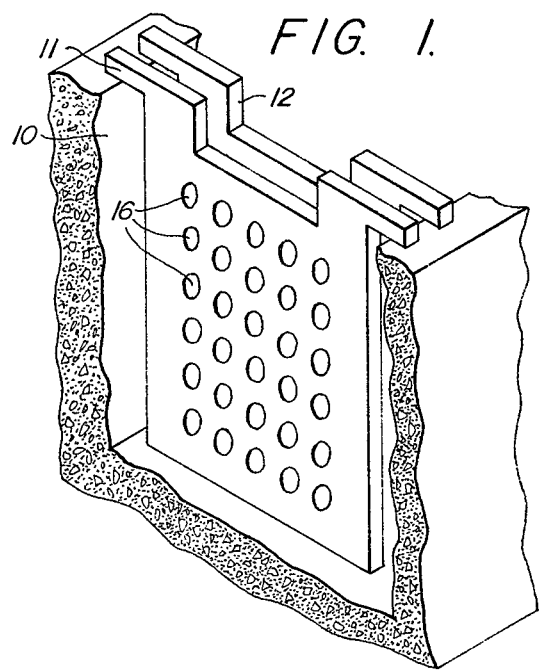
FIG. 1.
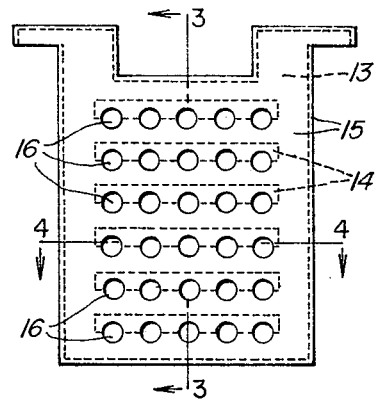
FIG. 2.
FIG. 3.
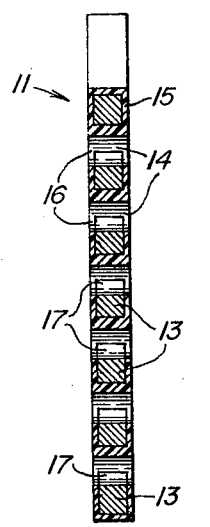
FIG. 4.
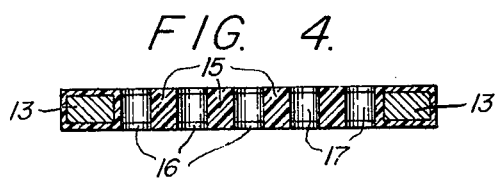
FIG. 5.
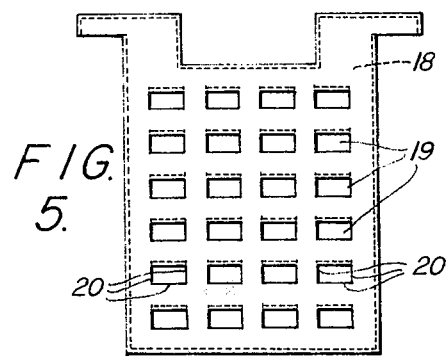
FIG. 6.
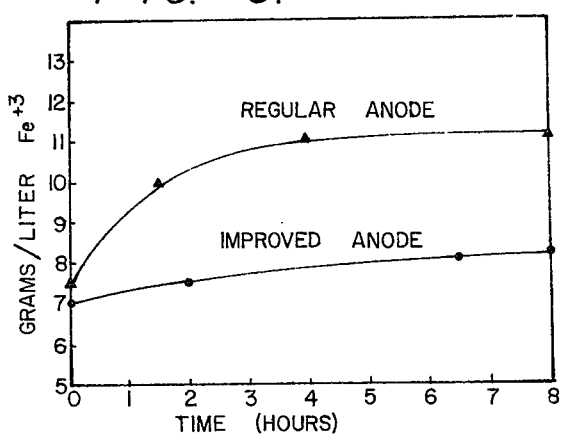
FIG. 7.
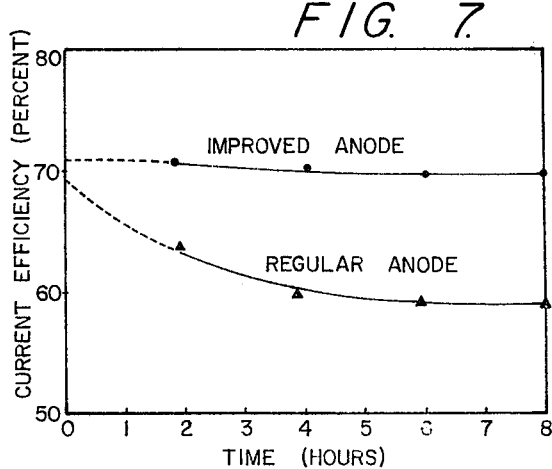

ELECTROWINNING CELL HAVING AN ANODE WITH NO MORE THAN ONE-HALF THE ACTIVE SURFACE AREA OF THE CATHODE

BACKGROUND OF THE INVENTION

1. FIELD

The invention is in the field of electrolytic cells and anodes therefor as used in the electrowinning of metals from electrolytes containing values of such metals along with significant concentrations of ferric or other oxidizing ions.

2. STATE OF THE ART

The typical anode in use today for the electrowinning of metals from an electrolyte containing values of such metals is made entirely of electrolytically active material, is smooth surfaced, and is of substantially the same size and geometrical configuration as the complimentary cathode. Although the anode is sometimes perforated for one reason or another, the active surface area of the anode of an anode-cathode pair in an electrowinning cell is about equal to or greater than that of the cathode.

A common problem in electrowinning processes, in which impure electrolytes are used, is poor current efficiency. The principal cause is the consumption of current by the cyclic oxidation and reduction of certain ions which can be present in solution in either an oxidized or a reduced state. Some common examples of such redox couples are $Fe^{+3}/Fe^{+2}$; $CeOH^{+3}/Ce^{+3}$; $Cu^{+2}/Cu^{+}$; $Co^{+3}/Co^{+2}$; $Cr_2O_7^{-2}/Cr^{+3}$; and $MnO_4/Mn^{+2}$. The most common of these in the electrowinning of copper, when the iron concentration in the electrolyte is appreciable (e.g. 5–10 gpl), is $Fe^{+3}/Fe^{+2}$. A current of approximately 5 amps/ft$^2$ can be consumed in a copper electrowinning cell operated at 15 amps/ft$^2$, 25°C, and 10g/1 dissolved iron, by the following electrode reactions involving the dissolved iron:

$Fe^{+2} \rightarrow Fe^{+3} + e$   Anode
$Fe^{+3} + e' \rightarrow Fe^{+2}$   Cathode A continuous cycle of oxidation and reduction can occur if the ions produced at the cathode can move freely to the anode and vice versa. This is the case in a conventional electrowinning cell which does not have a diaphragm dividing the anode and cathode compartments.

The various anode constructions that appear in the prior art patents, such as perforated anodes or anodes provided with upwardly inclined apertures in their broad face surfaces, are not directed toward the solution of the cyclic oxidation-reduction problem, nor do they recognize or effectively deal with that problem.

SUMMARY OF THE INVENTION

According to the invention, the efficiency of an electrowinning cell is increased by reducing the current-robbing, cyclic, oxidation-reduction reactions taking place in the cell. This is achieved by utilizing in the cell an anode having substantially similar geometrical configuration and size as its complimentary cathode, but one which has significantly less electrolytically active surface area than the cathode. The reduced electrolytically active anode surface area may be obtained by constructing the anode of both electrolytically active and electrolytically inactive material such that the electrolytically inactive material provides part of the surface area of the anode while the electrolytically active material provides the remaining surface area. The reduced anode surface area may alternatively be obtained by constructing the anode entirely of electrolytically active material, but of greatly reduced surface area as compared with the conventional anode of a normal anode-cathode pair. For example, an open latticework of electrolytically active material could be employed. It is preferred that the active surface area of the anode be reduced to less than one-fifth that of the cathode, although significant results are obtained when the anode surface area is about one-half that of the cathode.

When using both electrolytically active and electrolytically inactive material, it is preferred that the active surface area be recessed in the inactive material, so as to be removed from the area of electrolyte turbulence within the electrolytic cell.

DRAWING

The invention is specifically disclosed with reference to particular embodiments constituting the best mode presently contemplated of carrying out the invention in actual practice. In the drawing:

FIG. 1 is a fragmentary and largely schematic view in perspective of a typical electrowinning cell in accordance with the invention, only one of the anode-cathode pairs being shown;

FIG. 2, a view in broadside elevation of the anode of FIG. 1, concealed portions being indicated by broken lines;

FIG. 3, a vertical section taken on the line 3—3 of FIG. 2 and drawn to a considerably larger scale;

FIG. 4, a similar view in horizontal section taken on the line 4—4 of FIG. 2;

FIG. 5, a view in broadside elevation of an alternative embodiment of the anode;

FIG. 6, a graph comparing ferric ion concentration in the electrolyte of a cell such as shown in FIG. 1, utilizing the anodes of FIG. 5, with ferric ion concentration in the same cell utilizing conventional anodes;

FIG. 7, a similar graph comparing current efficiency.

DETAILED DESCRIPTION OF THE ILLUSTRATED EMBODIMENT

Referring to FIG. 1, an electrowinning cell is shown comprising an electrolyte-containing tank 10 and pairs of anode and cathode electrodes 11 and 12, respectively. The anode and complimentary cathode of each pair are of similar geometrical size and shape.

Anode 11 is formed to minimize the usual cyclic, oxidation-reduction reactions, so as to significantly increase current efficiency. It has been found that by decreasing the available surface area of the anode, at which the redox reaction can take place, the rate of the undesirable reaction is significantly decreased. Moreover, it has also be found that by reducing exposure of such area to electrolyte agitation, the redox reaction rate is further decreased. Thus, the important design criteria for the anode in achieving maximum efficiency is decrease of its normal active surface area in relation to the active surface area of the complimentary cathode.

While there is no sharp dividing line that can be regarded as critical with respect to relative amounts of active surface areas, we have found that inhibition of redox reactions become significant when the anode active surface area is about one-half the cathode active surface area, and that the degree of inhibition increases in extent as the anode active surface area becomes even less with respect to the cathode active surface area. We presently prefer the active surface area of the anode to be about one-fifth that of the cathode. As previously indicated, placing the active surface area of the anode out of zones of electrolyte agitation also aids in the inhibition of the redox reactions.

The anodes of FIGS. 2 and 5 are designed with these criteria in mind, and represent presently preferred embodiments of the invention. However, it will be apparent that other structural arrangements may be employed.

Referring to FIG. 2, the anode 11 comprises a grid 13 of electrolytically active material, such as a lead alloy, having voids 14 and being coated with an electrolytically inactive material, such as plastic 15, which also fills in the voids 14. Holes 16 are drilled through the anode body as thus formed, so as to intersect the edges of the voids 14 as indicated.

It can be seen that the only electrolytically active material exposed to the electrolyte is that defining portions 17 of the holes 16 drilled through the anode body and located interiorly of the anode. Otherwise, the electrolytically active material constituting the grid 13 is covered by the plastic 15.

The active areas 17 within the holes 16 are out of the zones of turbulent flow of electrolyte as disposed between the electrodes and extending along the broad and flat, parallel surfaces thereof. Also, the locations of such active areas 17 at the bottoms of the respective holes prevent anodically-generated oxygen bubbles, from exercising a scrubbing action on these active surfaces. The bubbles rise from the active area 17 and impinge only on inactive areas, before they emerge from the holes 16 into the turbulent zones. Although anode 11 is substantially similar to cathode 12 in overall geometrical configuration and size, most of its surface area is inactive. Thus, the amount of active anode surface area is greatly reduced over that of the normal anode-cathode pair. It is normally preferred that the anode active area be no more than one-fifth of the cathode active area and economic advantages are usually obtainable down to one-tenth.

It should be kept in mind that it is important that the overall size and configuration of anode and cathode remain substantially equal and that the anode active areas be distributed substantially symmetrically throughout the anode in order to get a uniform rate of deposition on the cathode.

In the anode of FIG. 5, a conventional solid plate anode, formed entirely of electrolytically active material 18, is punched to provide a lattice of holes 19. In this instance, such holes are of square configuration and extend entirely through the anode. They may, however, be of other configurations and could be mere recesses in one or both broad surfaces of the anode. Alternately, the anode may be cast to the desired final configuration.

However formed, such perforate, solid plate anode is coated, except for the bottom and sides of the holes 19, with an electrolytically inactive material, such as a silicon polymer. The electrolytically active surface of the anode is thus reduced in extent, see 20, to only the bottom and sides of the holes 19, which is only about one-fourth of what the anode active surface would have been without the inactive material and about one-fourth of the active surface area of the complimentary cathode. As in the first embodiment, the active areas 20 are recessed within the anode body so as to be out of the zones of turbulent electrolyte.

Comparative tests were made between an electrowinning cell conforming to the invention, with anodes of the type of FIG. 5, and an electrowinning cell utilizing similar anodes in which the electrolytically active material 18 was not coated with electrolytically inactive material.

The graph of FIG. 6 compares ferric ion concentration in the first electrowinning cell during the electrowinning of copper with the ferric ion concentration in the second electrowinning cell. It will be seen that the concentration of ferric ions was about equal in the two cells before electrowinning began, but increased significantly in the second cell during electrowinning. This indicated that cyclic oxidation-reduction reactions were taking place in the second cell to a much greater extent than in the first cell.

The graph of FIG. 7 compares current efficiencies in the same tests. It will be seen that the current efficiency is much improved in the first cell over that in the second cell, again showing the advantage gained by use of the invention.

The purposes of the invention could also be accomplished by making the anode entirely of electrolytically active material, but of significantly reduced surface area as compared with the conventional anode of a normal anode-cathode pair. Thus, if the construction of FIG. 5 is employed, the holes 19 would be considerably larger and fewer. Any kind of open lattice-work construction could be employed, for example, slender bars of electrolytically active material interlaced together.

The invention may also be practiced by merely coating portions of a standard anode with an electrolytically inactive material, or by providing numerous spots of electrolytically active material, such as rare earth oxides or platinum, on the surface of a conductive but electrolytically inactive material such as titanium, so as to create a lattice of active material distributed across the broad faces of the anode, thus reducing the active area of the anode compared to the active area of the complimentary cathode. It is not necessary that the active sites be removed from agitation of electrolyte, although such removal is preferred and improves the results obtained.

Whereas this invention is described and illustrated with reference to specific presently preferred embodiments thereof, it should be realized that various changes may be made therein and other specific forms may be constructed by those skilled in the art without departing from the inventive concepts here disclosed.

What we claim is:

1. An electrowinning cell for use in the electrowinning of metals from an electrolyte containing values of same, comprising a tank for the electrolyte; and at least one anode-cathode pair of electrodes of substantially similar size and shape, the anode of which has a reduced active surface area relative to the active surface area of the cathode amounting to no more than about one-half the active surface area of the cathode to effectively inhibit redox reactions in and increase current efficiency of the cell, the active surface area of the anode being approximately equally distributed over the total area of the anode.

2. An electrowinning cell in accordance with calim 1, wherein the anode is constructed entirely of electrolytically active material in an open lattice formation.

3. An electrowinning cell in accordance with claim 1, wherein the anode is made up of both electrolytically active and electrolytically inactive materials.

4. An electrowinning cell in accordance with claim 3, wherein the electrolytically active surface area of the anode is recessed in the inactive surface area to substantially place it out of the area of electrolyte turbulence in the tank.

5. An electrowinning cell in accordance with claim 4, wherein the electrolytically inactive material of the anode is a coating covering electrolytically active material, and the recesses of the anode are formed by holes in the inactive material which expose the active material.

6. An electrowinning cell in accordance with claim 5, wherein the holes in the anode extend completely through the anode.

7. An electrowinning cell in accordance with claim 1, wherein the active surface area of the anode is between about one-half and one-tenth the active surface area of the cathode.

8. An electrowinning cell in accordance with claim 1, wherein the active surface area of the anode is about one-fifth the active surface area of the cathode.

* * * * *